United States Patent [19]

Hori et al.

[11] 4,125,091
[45] Nov. 14, 1978

[54] METHOD AND EQUIPMENT FOR CONTROL OF INTERNAL COMBUSTION ENGINE WITH FUEL-REFORMING DEVICE

[75] Inventors: Ryuzo Hori, Toyota; Kunihiko Masunaga, Okazaki; Toshio Funayama, Toyota; Hirohiko Hoshi, Toyota; Kazuhiko Ishiguro, Toyota; Hidetomo Umehara, Susonoshi, all of Japan

[73] Assignee: Toyota Jidosha Kogyo Kabushiki Kaisha, Aichi, Japan

[21] Appl. No.: 803,933

[22] Filed: Jun. 6, 1977

[30] Foreign Application Priority Data

Nov. 18, 1976 [JP] Japan ............................. 51-138649
Nov. 18, 1976 [JP] Japan ............................. 51-138647

[51] Int. Cl.² ........................................... F02B 43/08
[52] U.S. Cl. ............................ 123/3; 123/DIG. 12; 123/121; 123/127; 48/212
[58] Field of Search ............ 123/127, 121, 3, DIG. 12; 48/212

[56] References Cited

U.S. PATENT DOCUMENTS

| 1,954,968 | 4/1934 | Waters | 123/121 |
|---|---|---|---|
| 1,966,345 | 7/1934 | Harrel | 123/21 |
| 3,688,755 | 9/1972 | Grayson | 123/127 |
| 3,908,606 | 1/1974 | Toyota | 123/3 |
| 4,026,248 | 5/1977 | Lee | 123/3 |
| 4,059,076 | 11/1977 | Kosaka | 123/3 |

FOREIGN PATENT DOCUMENTS 2,322,688 11/1974 Fed. Rep. of Germany .......... 123/121

*Primary Examiner*—Ronald H. Lazarus
*Attorney, Agent, or Firm*—Oblon, Fisher, Spivak, McClelland & Maier

[57] ABSTRACT

Method and equipment for control of an internal combustion engine with a fuel-reforming device wherein air passing through the fuel-reforming device is mechanically controlled depending on the volume of air to be sucked into the engine without passing through the fuel-reforming device and is supplied into the air not passing through the fuel-reforming device, upstream of a throttle valve by means of an air pump; the total air volume sucked into the engine is detected; and the volume of fuel matching the total air volume is electrically controlled so that it can be supplied upstream of the fuel-reforming device into the air passing through the fuel-reforming device, and if necessary, also into the air not passing through the fuel-reforming device.

17 Claims, 8 Drawing Figures

METHOD AND EQUIPMENT FOR CONTROL OF INTERNAL COMBUSTION ENGINE WITH FUEL-REFORMING DEVICE

BACKGROUND OF THE INVENTION

1. Field of the Invention

The present invention relates to a method of equipment for control of the fuel and air to be supplied to an internal combustion engine with a fuel-reforming device.

2. Description of the Prior Art

For the purpose of reducing the harmful emission from a spark ignition internal combustion engine, a "lean" combustion of fuel is desirable. For this "lean" combustion, a fuel containing molecular hydrogen is useful.

There are conventionally two methods of supplying hydrogen to an internal combustion engine. In one method, hydrogen is carried on a vehicle in a high pressure vessel or in the form of, for example, liquified hydrogen or metal hydride. In the other method, mainly liquid hydrocarbon is reformed on the vehicle to yield a hydrogen-containing gas to be delivered to the engine. Of these two methods, the latter is preferable on account of its greater safety and availability for the existing fuel supply system.

The air excess rate of the engine which has a direct bearing on harmful emission and the fuel consumption depends upon the method selected for reforming hydrocarbon to yield a hydrogen-containing gas. The so-called partial oxidation method in which the air and hydrocarbon are reacted at an extremely low ratio of air to fuel in the presence of a catalyst is most popularly adopted on vehicles. In the vehicle-mounted fuel-reforming device based on the partial oxidation method, a complicated electronic control method or a rough method utilizing a small carburetor has been used for exact control of the air/fuel ratio in the fuel-reforming device or the air excess rate in the internal combustion engine.

Under application of the conventional electronic method of control, the equipment can be mechanically simplified but, electrically, it is considerably complicated, necessitating feedback control of the air flow rate or accurate setting of time lag and other factors. Meanwhile, under mechanical control utilizing, for example, a carburetor, exact control of the engine in all its operational ranges is very difficult, resulting in a lessening of the desirable effect of using the fuel-reforming device. Further, these two methods involve the difficulty of resetting the conditions when the displacement or compression ratio of the engine changes.

In the case of a gasoline-burning engine, the gas can be reformed in the permissible range of air/fuel ratios in the fuel-reforming device of 1.5 to 6, the range being adaptable up to the maximum of 4 times of flow rate fluctuations.

In the case of an internal combustion engine, however, the range in which combustion can take place with little yield of harmful emission is relatively narrow, that is, it is limited to 1.2–1.6 in terms of the air excess rate, which means that the maximum allowable range of flow rate fluctuations is a mere 30%. Thus, the fuel-reforming device tolerates a relatively rough control, while the internal combustion engine calls for an exact control.

Under application of the electronic control, the gas reforming conditions or the engine burning conditions can be controlled with considerably high accuracy. However, this is more than necessary and, is rather undesirable, because the combustion control of the engine is sacrificed for the control of the fuel-reforming device. Mechanical control by the carburetor, however, is not favorable for the internal combustion engine which needs exact control, because the fuel volume depends on the air volume supplied to the fuel-reforming device. Accordingly, the fluctuation of the air volume to the fuel-reforming device directly affects the burning state in the engine.

SUMMARY OF THE INVENTION

In view of the difference in the required accuracy of control between the fuel-reforming device and the internal combustion engine, a main object of the present invention is to realize a small-scale simplified control of a vehicle-mounted fuel-reforming device including electrical control of the fuel supply to the fuel-reforming device depending on the detected total air supply to the internal combustion engine, which calls for high accuracy of control; and mechanical control of the air/fuel ratio in the fuel-reforming device, which calls for less high accuracy of control.

Another object of the present invention is to provide a method for control of an internal combustion engine with a fuel-reforming device wherein the application of the fuel-reforming device is limited to the partial load range which is more frequently used such as when the vehicle runs through urban areas, thereby making the engine burn with less generation of harmful exhaust gases without sacrificing performance in the high load range.

Still another object of the present invention is to provide a method for control of an internal combustion engine with a fuel-reforming device wherein the mixed gas is burned in the "lean" range on the average and the heat loss in the fuel-reforming device is redeemed by an increase in the thermal efficiency of the engine, thereby generally saving fuel consumption.

Still another object of the present invention is to provide a method for control of an internal combustion engine with a fuel-reforming device wherein the temperature in the fuel-reforming device which becomes very hot with an increase in the supply of materials is prevented from reaching an excessively high value by minimization of the volume of supply, thereby increasing the durability of the fuel-reforming device.

Still another object of the present invention is to provide a method for control of an internal combustion engine with a fuel-reforming device wherein the engine can be operated even when, for some cause, the air supply to the fuel-reforming device diminishes or entirely ceases putting the fuel-reforming device out of function.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings in which.

DETAILED DESCRIPTION OF THE PREFERRED EMBODIMENTS

Figure 1:
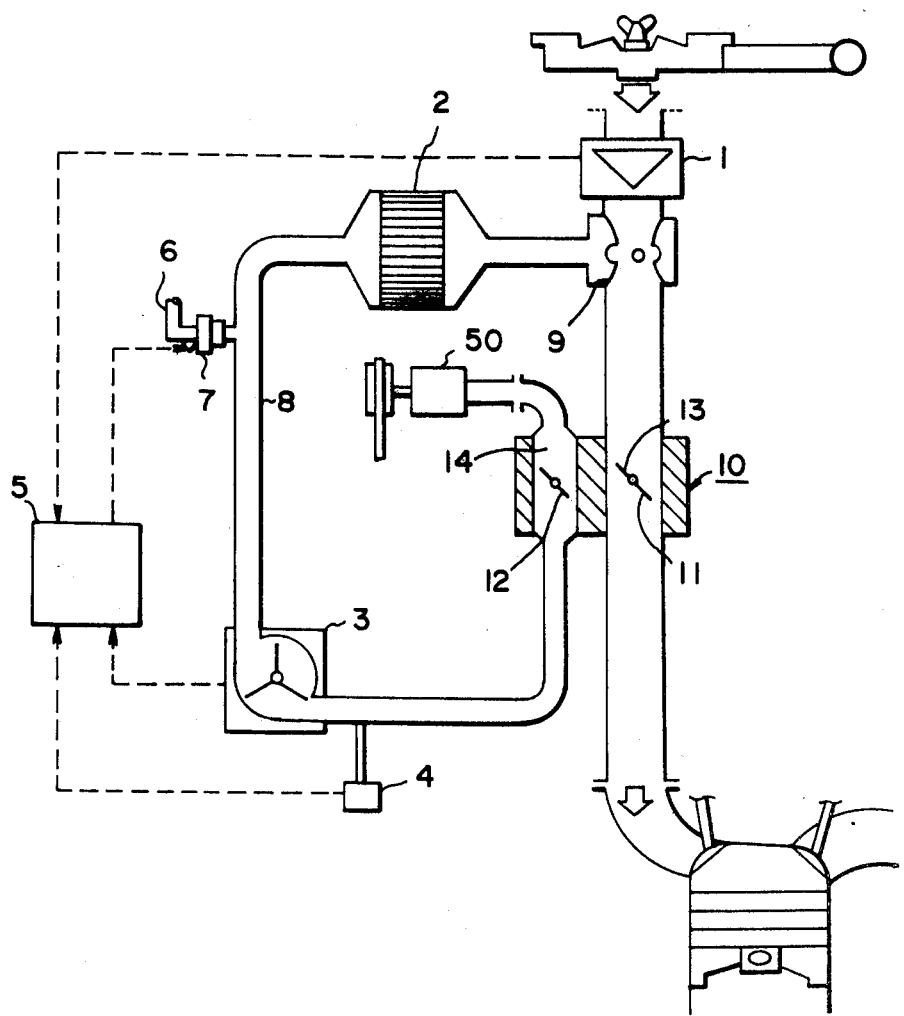
FIG. 1 illustrates a first embodiment of the present invention.

The method for control of a vehicle-mounted fuel-reforming device according to the present invention comprises sucking into the internal combustion engine a throttle-valve controlled air without passing through the fuel-reforming device; supplying to the fuel-reforming device by means of an air pump the air with its volume mechanically controlled by a valve interlocked with the throttle valve; detecting the volume of air not passing through the fuel-reforming device and the volume of air supplied to the fuel-reforming device to find the total air volume sucked into the engine and delivering the volume of fuel matching the total air volume into the air under electrical control; causing the air supplied to the fuel reforming device and the fuel supplied into the air to react together within the fuel-reforming device to yield a reformed gas; and supplying the reformed gas into the air not passing through the fuel-reforming device, upstream of the throttle valve.

Thus, according to the present invention, electrical control is applied for measurement of air volume sucked in before a reformed gas is introduced into the engine, for exact measurement of air volume sent to the fuel-reforming device, for pressure detection of air sent to the fuel-reforming device and subsequent correction of the air volume sent to the fuel-reforming device, for calculation of the total air volume to be sucked upon a signal of the air volume measured into the engine containing a reformed fuel, for calculation of the necessary fuel supply to the fuel-reforming device depending on the total air volume thus calculated, and for control of the fuel supply thus calculated to the fuel-reforming device. Meanwhile, mechanical control is applied for simultaneous coordinated control of the engine-sucked air volume and the fuel-reforming device-delivered air volume by means of two control valves coupled by, for example, a linkage.

The following two embodiments of the present invention will now be described.

In the first embodiment the fuel matching the total air volume sucked into the engine is supplied, upstream of the fuel-reforming device, into the air passing through the fuel-reforming device.

In the second embodiment, the fuel is supplied respectively into the air supplied to the fuel-reforming device and into the air sucked into the engine without passing through the fuel-reforming device. The fuel matching the total air volume sucked into the engine and the fuel matching the detected air volume passing through the fuel-reforming device are supplied into the air passing through the fuel-reforming device, upstream of the fuel-reforming device. When the fuel is short for the total air volume, the insufficiency is corrected through an additional supply of fuel to the air not passing through the fuel-reforming device. When the fuel is excessive, the excess is corrected by reducing the supply of fuel into the air passing through the fuel-reforming device.

In these two embodiments, the supplied fuel and air react in partial oxidation in the fuel-reforming device, thereby yielding a reformed gas with a high content of hydrogen. For effective generation of the reformed gas, the ratio of air to fuel to be supplied to the fuel-reforming device should be set at 1.5–6 when the fuel is gasoline.

For the purpose of preventing air pollution and effecting perfect combustion, the ratio of total air to total fuel should be controlled such that the combustion in the engine can take place in the "lean" range.

The present invention will now be described in detail with reference to the drawings. In FIG. 1, an air volume sensor 1 to measure the volume of the engine-sucked air is disposed in the engine suction path. The air is transmitted into the fuel-reforming device 2 through the air pump 50. In the air path to the fuel-reforming device are installed an air volume sensor 3 to measure the volume of air to be sent into the fuel-reforming device 2 and a pressure sensor 4 to correct the flow rate in the air volume sensor 3 by measuring the pressure of the air sent in. The signals from the air volume sensor 1, the air volume sensor 3 and the pressure sensor 4 are transmitted to the controller 5, where the total volume of air to be delivered to the engine is calculated and the necessary volume of fuel to be supplied depending on the calculated air volume is claculated from a preset value. Upon a signal of the necessary fuel supply, the magnetic valve 7 provided in the fuel pipe 6 acts to exactly measure the fuel, which is supplied in the air path 8 to the fuel-reforming device 2. In the fuel-reforming device 2, the air and the fuel mixed therewith react together and, in the presence of a catalyst, yield a hydrogen-containing reformed gas. In the mixer 9, the reformed fuel blends with the engine-sucked air and the air/fuel ratio of the mixed gas is set so that harmful emissions can be minimized. If the mixer 9 is a venturi type, a suction force proportional to the engine-sucked air volume will be indicated. Accordingly, the output of the air pump can be reduced.

The sucked volume of the mixed gas, which goes into the engine and burns there, is controlled by the throttle valve 11 in the control valve 10, which is interlocked with the acceleration pedal to be handled by the operator. The air path to the fuel-reforming device 2 is equipped with a butterfly valve 12 to control the volume of air sent to the fuel-reforming device 2. The throttle valve 11 and the butterfly valve 12 are interlocked by a linkage. Thus, the flow rates in the path 13 provided with the throttle valve 11 and in the path 14 provided with the butterfly valve 12 are correlated. This correlation is so set as not to exceed a specific operational range required of the engine.

The constitution and function of the control valve assembly 10 will now be described in detail referring to FIGS. 2 to 5. The major structural parts are the throttle valve 11 and the butterfly valve 12. The sectional areas of the paths 13, 14 provided with these valves depend on the flow rate at maximum output and the average ratio between the air volume and the mixed gas volume supplied to the fuel-reforming device 2. The assembly 10 can be provided with various link mechanisms which give desirable valve opening characteristics. FIG. 3 illustrates an example in which the link mechanism is designed so that the valves 11 and 12 can be opened to approximately the same angle.

The force from the transmitting shaft 12 which is operated by the operator and supported by another part is transmitted to a stay 17 fixed with a nut to the stem 16 of the butterfly valve 12, and, overcoming the force of the spring 18, it opens the butterfly valve 12. The link 19 is connected to a stay 21 fixed to the stem 20 of the other valve 11, and, acting together with the action of the stay 17, it overcomes the force of the spring 22 and opens the throttle valve 11. The screws 23, 24 set the valve opening angle during idling and limit the movements of the stays 21, 17 with which they come into contact during idling.

The first method and the function of the equipment in the first embodiment in FIG. 1 will now be described.

Designating the weight of air sent into the fuel-reforming device 2 as $q_1$, the volume of air sucked into the engine as $q_2$ and the volume of fuel as $f$, the air/fuel ratio $k_o$ in the fuel-reforming device 2 and the sucked air/fuel ratio $K_o$ in the engine can be generally expressed by:

$$k_o = q_1/f \quad (1)$$

$$K_o = (q_1 + q_2)/f \quad (2)$$

If $q_1/q_2 = t$, from (2) is obtained:

$$q_1/f + q_1/tf = K_o \quad (3)$$

Substituting (1) into (3), there is obtained:

$$k_o + k_o/t = K_o \quad (4)$$

And transforming (4), there is obtained:

$$t = k_o/(K_o - k_o) \quad (5)$$

When the fuel is gasoline, the maximum value of $K_o$ will be 19 and the values of $k_o$ range from 1.5 to 6. Thus, $t = 0.09 - 0.46$, that is, $t$ has an extremely wide range of allowable values.

According to the present invention, it is quite easy to arrange the mechanical control such that, in the control valve assembly, $t$ = set value ± 0.03 or so. Thus, under the combination with electronic control which can precisely regulate the value of $K_o$, it is possible to generate a hydrogen-containing gas so that the harmful contents in the exhaust gas from the engine can be reduced.

Figure 6:
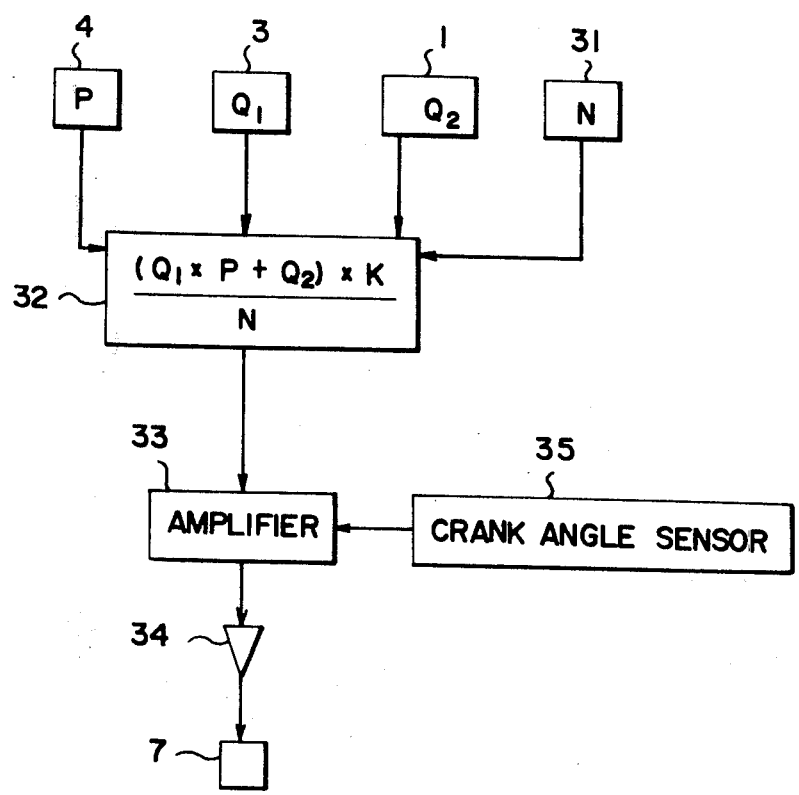
FIG. 6 is a block diagram of a controller in the first embodiment of the present invention.

The constitution as well as the function of the arithmetic circuit of the controller 5 in the first embodiment will now be described. FIG. 6 illustrates the arithmetic circuit of the controller 5. The signal $Q_1$ proportional to the air volume from the sensor 31 of the air volume to the reforming device 2, the signal P matching the pressure of air from the pressure sensor 4, the signal $Q_2$ proportional to the air volume from the engine-sucked air volume sensor 1, the signal N proportional to the rpm from the engine revolution sensor 31 and the factor K to determine the engine air/fuel ratio are converted in the arithmetic unit 32 to a signal $(Q_1 \times P + Q_2)/N \times K$ which activates the injector 34 through the amplifier 33. Action of the injector 34 causes the magnetic valve 7 to open, thereby supplying the fuel to the air path 8. The pressure sensor 4 may be omitted and, in that case, the signal P will invariably be 1.

The function of the amplifier 33 is to sense the crankshaft position from the crank angle sensor 35, start the action of the injector 34 upon this signal, and maintain the action of the injector for a period matching the signal from the arithmetic unit 32.

Figure 2:
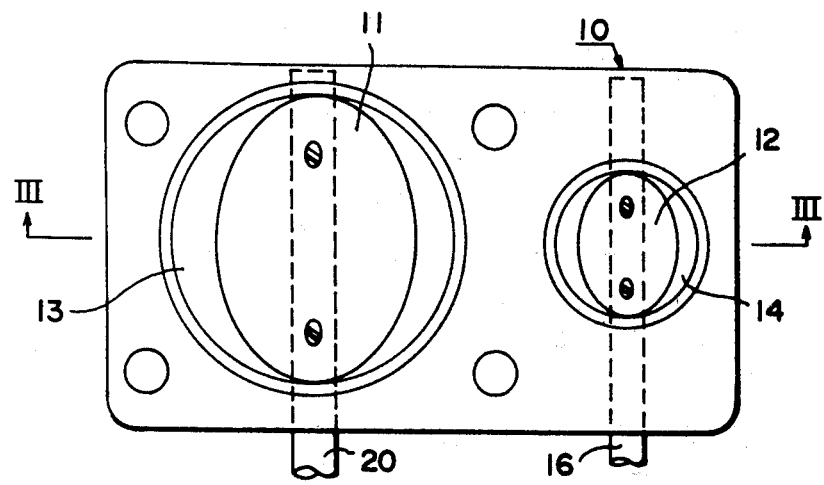
FIG. 2 is an enlarged plan view of a part of the control valve in FIG. 1.
Figure 3:
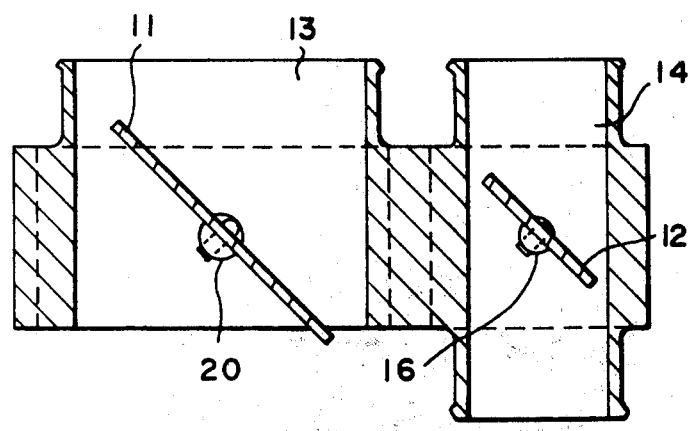
FIG. 3 is a section view along the line III—III in FIG. 2.
Figure 4:
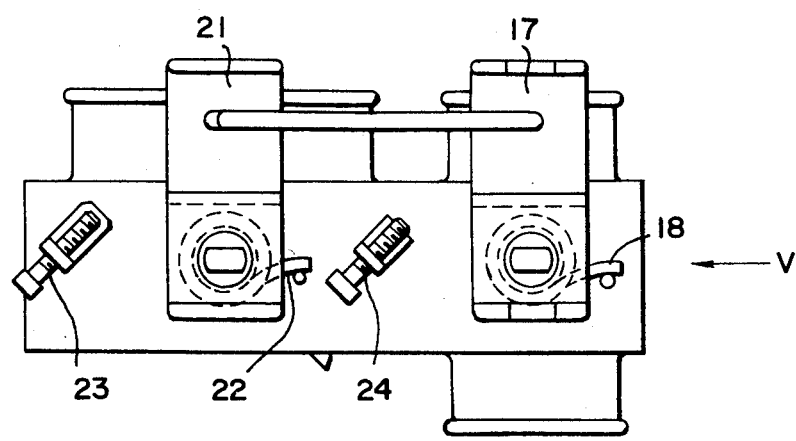
FIG. 4 is a front elevation view corresponding to FIG. 2.
Figure 5:
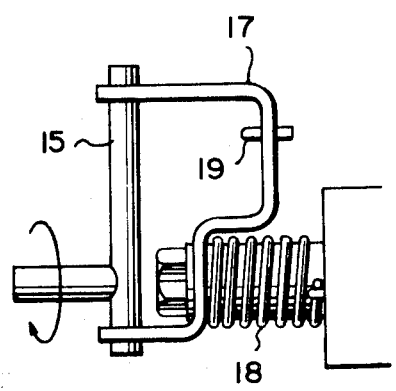
FIG. 5 is a side elevation view as viewed from the arrow V in FIG. 4.

In an actual test in which the engine-sucked air/-fuel ratio was set at 19 and the sectional area ratio of the paths 13, 14 indicated in FIG. 2 or 3 was set at 4 : 1, the variation of $K_o$ was 19 ± 0.5 in the engine revolution range from 1,000 to 3,000 rpm and in the valve opening range from 5° to full-open, while the variation of $K_o$ was 3.2 ± 0.7. These values testify that the aim of the control method according to the present invention is completely attained.

As evident from the above description, when the method and equipment of the first embodiment of the present invention are employed, the air/fuel ratio $K_o$ in the internal combustion engine can be exactly controlled, the air/fuel ratio $k_o$ in the fuel-reforming device can also be mechanically controlled to the necessary range, and, accordingly, the vehicle-mounted fuel-reforming device can be controlled to a necessary and sufficient extent. This can indirectly contribute to reducing the size of the control equipment, saving installation space and decreasing manufacturing cost.

The second embodiment of the present invention will now be described with reference to the drawings.

Figure 7:
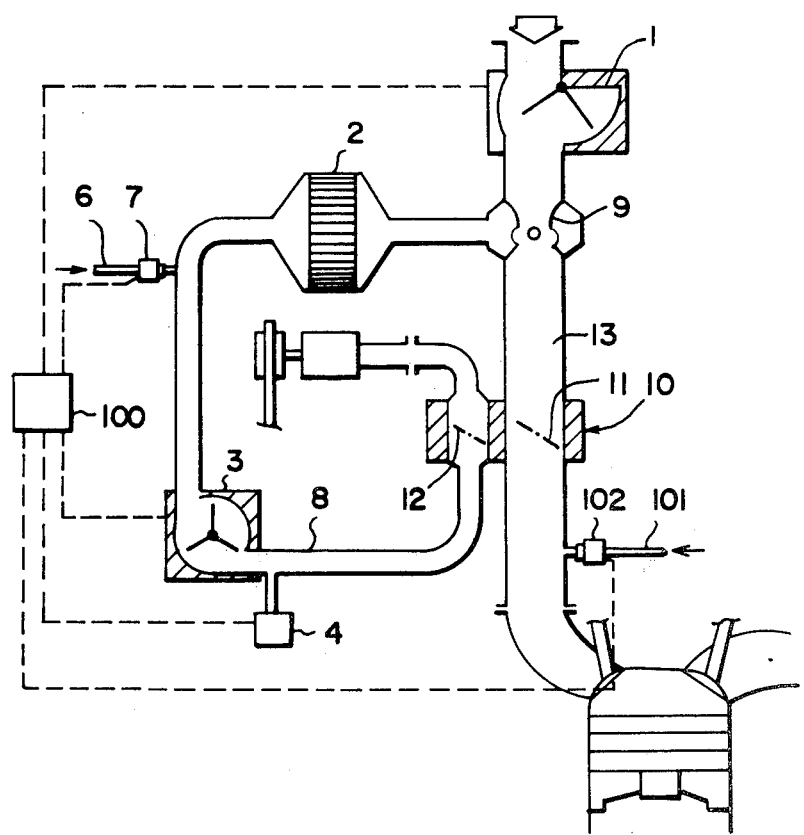
FIG. 7 illustrates the second embodiment of the present invention.

In FIG. 7 which illustrates the system of the second embodiment, like parts are denoted by like symbols and a detailed account is omitted.

The major difference in the equipment between FIG. 7 and FIG. 1 lies in that a fuel supply pipe 101 and a magnetic valve 102 are also provided in the air path 13 which does not pass through the fuel-reforming device 2 and they are controlled by the controller 100.

In FIG. 7, the volume of air supplied to the fuel-reforming device 2 is detected by the air volume sensor 3 installed in the air path 8, while the pressure of the air measured by the pressure sensor 4 is used to correct the air volume measured by the sensor 3. These measured volumes are transmitted as electric signals to the controller 100, where the necessary fuel supply to the fuel-reforming device 2 matching the measured air volume is calculated and, therefore, the necessary volume of fuel can be delivered through the action of the magnetic valve 7 in the fuel supply pipe 6 provided in the air path 8 to supply the fuel, downstream of the sensor 3. Accordingly, the temperature in the fuel-reforming device which usually becomes extremely hot can be held to a minimum required value.

From the signals of the sensors 1, 3 and 4, the controller 100 calculates the total air volume sucked into the engine and, through comparison with the preset volume of fuel needed for the total air volume, determines an excess or an insufficiency of the fuel. In the case of an insufficiency, the magnetic valve 102 installed in the fuel supply pipe 101 which supplies the fuel without passing through the fuel-reforming device 2 acts to supply the fuel directly to the engine without passing through the fuel-reforming device 2. When the fuel supplied to the air path 8 through the valve 7 for the preset total air/fuel ratio is excessive, the controller 100 activates the valve 7, thereby reducing the volume of fuel passing through the valve 7 so that the total air/fuel ratio may meet the preset value. This preset value is such that the engine can burn in the "lean" range, thereby enhancing the thermal efficiency of the engine as well as decreasing the harmful content of the exhaust gas.

Figure 8:
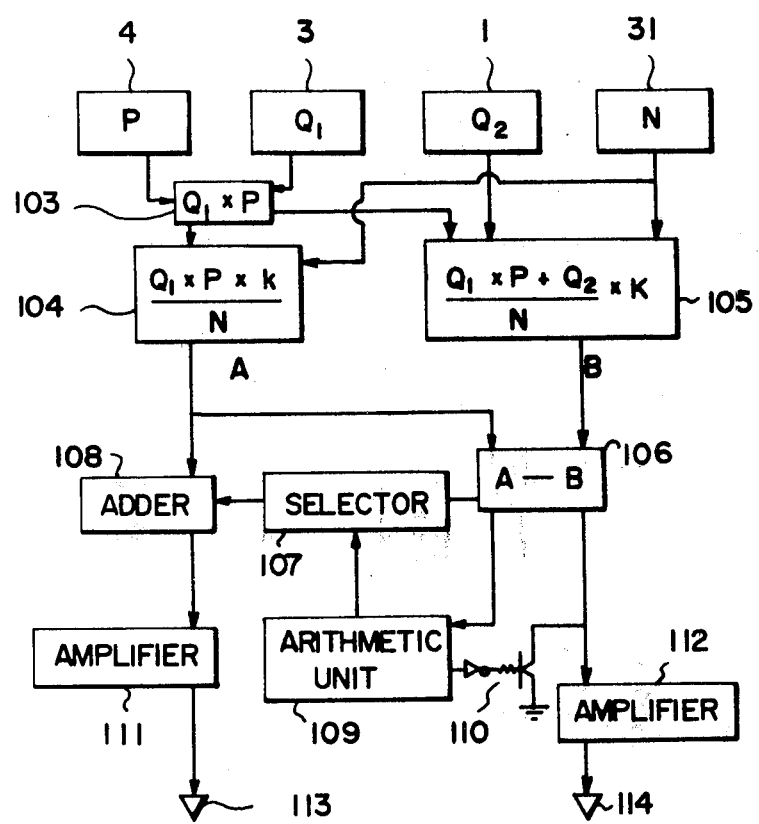
FIG. 8 is a block diagram of a controller in the second embodiment of the present invention.

Referring to FIG. 8, the arithmetic circuit of the controller 100 in the second embodiment will now be described.

The signal P proportional to the pressure of air supplied to the fuel-reforming device 2 which is transmitted from the pressure sensor 4 and the signal $Q_1$ proportional to the air volume transmitted from the sensor 3 of the air volume supplied to the reforming device are converted in the arithmetic unit 103 to a signal $Q_1 \times P$. This signal, the signal N from the engine revolution sensor 31 and the factor K to determine the air/fuel ratio in the reforming device 2 are converted in the arithmetic unit 104 to a signal $(Q_1 \times P \times K)/N$. On the other hand, the signal produced in the arithmetic unit 103, the signal $Q_2$ proportional to the air volume which is transmitted from the engine sucked into the air volume sensor 1, the signal N and the factor K to determine the air/fuel ratio in the engine are converted in the arithmetic unit 105 to a signal $(Q_1 \times P + Q_2)/N \times K$. Then, the signal (A) from the arithmetic unit 104 and the signal (B) from the arithmetic unit 105 are converted in the subtractor 106 to a signal A - B. If the signal A - B is positive, the arithmetic unit 109 acts on the selector 107, thereby rendering a zero signal to the adder 108. Then, the signal $A(A + 0 = A)$ is sent to the amplifier 111 to activate the injector 113, while the transistor 110 does not act and the amplifier 112 is activated depending on the signal A - B.

If the signal A - B is negative, the arithmetic unit 109 activates the transistor 110, thereby grounding the signal to the amplifier 112 and stopping the action of the injector 114. Meanwhile, the signal A - B is sent from the selector 107 to the adder 108. Then, as a result of a negative signal being added, the signal to the amplifier 111 is correspondingly reduced, thereby restricting the action of the injector 113.

The pressure sensor 7 may be omitted and, in that case, the signal P will invariably be 1. The injector 113 causes the action of the valve 7, while the injector 114 causes that of the valve 102.

The factor K to determine the air/fuel ratio in the reforming device 2 is a constant value, but the factor K to determine the air/fuel ratio in the engine which has a great bearing on the exhaust composition and the thermal efficiency of the engine may be set as a function of the engine revolution and the engine load.

If the injector 114 is designed and adjusted such that it can work in virtually the whole range of operation, that is, in practically the whole range of A - B values, the engine can always run in satisfactory condition regardless of the reforming device which is liable to be slow in response to sudden acceleration or deceleration.

The function of the equipment of the second embodiment of the present invention will now be described.

The controllable range of air/fuel ratios in the fuel-reforming device 2 depends mainly on the catalyst, but, if the ratio is appropriately taken in the range of 1.5-6, a reformed gas with a superior burning characteristic will be yielded. According to the method of the invention in which the air/fuel ratio in the fuel-reforming device 2 is electrically controlled, the air/fuel ratio can be stable in practically the whole range.

In an internal combustion with a fuel-reforming device 2, when it becomes necessary to maintain a fuel supply to the fuel-reforming device 2 with a modified air/fuel ratio in the fuel-reforming device 2, the air/fuel ratio in the fuel-reforming device 2 is apt to become rather high. Therefore, it is desirable to set a low value.

Being usually set at about 3, the air/fuel ratio in the fuel-reforming device 2 is unlikely to be forced out of the allowable range.

The air/fuel ratio in the fuel-reforming device 2, the total air/total fuel ratio in the engine, the performance of the engine, and the effective contents in the exhaust gas are related to one another as follows. Assuming that the volume of fuel passing through the valve 7 is $f_1$; the value of $a_1 = q_1/f_1$, where $q_1$ is the volume of air in the fuel-reforming device and is constant; and the ratio of the total air volume $q_1 + q_2$ to the total fuel volume $f_1 + f_2$, where $f_2$ is the volume of fuel passing through the valve 102, that is, $a_2 = (q_1 + q_2)/(f_1 + f_2)$, is constant. Then, the following equations hold:

$$c = q_1/q_2 \quad (1)$$

$$a_1 = q_1/f_1 \quad (2)$$

$$a_2 = (q_1+q_2)/(f_1+f_2) \quad (3)$$

If $a_1/a_2 = d$ and $f_2/f_1 = s$, then from (1), (2) and (3) is obtained:

$$s = d/c + d - 1 \quad (4)$$

Thus, $s$ increases with a decrease in $c$; namely $f_2$ becomes more than $f_1$. In consequence, the volume of fuel delivered to the fuel-reforming device 2 decreases, while the volume of fuel which goes directly to the air path 13 increases. Thus, a fuel with high calorific value per unit volume is burned in the engine. Namely, when the operator opens the valve 11 to increase the output, a fuel with high calorific value per unit volume is delivered to the engine, whereby the engine can maintain high performance. Conversely, in operation in urban areas when the valve 11 is half-open, the fuel and air passing through the fuel-reforming device 2 increase, resulting in an increase in the reformed gas and in a decrease in the harmful content of exhaust gas.

The value of $f_2/f_1$ depends on the characteristic of interlocking the valves 11 and 12. This characteristic is considered in designing and manufacturing the mechanism interlocking the valves 11 and 12, for example, a linkage, and the valves 11, 12 themselves. Basically, however, such a desirable characteristic is assured and therefore great caution is not required in high load designing.

Thus, the following effects can be expected from the method and equipment of the second embodiment of the present invention.

According to this method which combines electrical control with mechanical control, the equipment can be made compact and inexpensive with the necessary performance, particularly the engine-sucked total air/fuel ratio maintained with high precision.

According to this method, under high frequency of using the fuel-reforming device, the volume of fuel passing through the fuel-reforming device can be increased; the gas can be burned with extremely little content of harmful elements; under high load, the volume of fuel not passing through the fuel-reforming device can be increased to increase the output; and, accordingly, under all the working conditions of the engine, the fuel can be appropriately controlled.

According to this method in which the fuel supply to the fuel-reforming device and the total fuel supply to the engine are cleverly controlled meeting respective air supplies, the heat loss unavoidable in the fuel-reforming device can be redeemed through an increased efficiency of the engine, thereby minimizing the fuel consumption.

According to this method in which the fuel is supplied under electrical control to the fuel-reforming device, the temperature in the fuel-reforming device which becomes extremely high can be held to a necessary minimum, thereby increasing the durability of the fuel-reforming device.

And, according to this method which provides a system to supply air and fuel to the engine without passing through the fuel-reforming device, the engine can run with safety even when the fuel-reforming device fails for some cause and loses its function.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A method for control of an internal combustion engine with a fuel-reforming device comprising:
   sucking into the engine air under control by a throttle valve without passing through the fuel-reforming device;
   supplying air under mechanical control of its volume by a valve interlocked with the throttle valve, to the fuel-reforming device by means of an air pump;
   detecting the volume of air not passing through the fuel-reforming device and the volume of air supplied to the fuel-reforming device to find the total air volume sucked into the engine and supplying the volume of fuel matching the total air volume under electrical control into the air;
   reacting the air supplied to the fuel-reforming device with the fuel supplied into the air in the fuel-reforming device to yield a reformed gas; and
   supplying the reformed gas into the air not passing through the fuel-reforming device, upstream of the throttle valve.

2. The method of claim 1 wherein the volume of fuel matching the total air volume sucked into the engine is supplied into the air passing through the fuel-reforming device, upstream of the fuel-reforming device.

3. The method of claim 1 wherein the fuel is supplied respectively into the air supplied to the fuel-reforming device and into the air sucked into the engine without passing through the fuel-reforming device; the volume of fuel matching the detected air volume passing through the fuel-reforming device is supplied into the air passing through the fuel-reforming device, upstream of the fuel-reforming device; when the supply of fuel matching the total air volume sucked into the engine is insufficient, the insufficiency is corrected by increasing the fuel supply to the air not passing through the fuel-reforming device; and when the supply of fuel is excessive, the excess is corrected by decreasing the fuel supply to the air passing through the fuel-reforming device.

4. The method of claim 1 wherein a reformed gas containing a large quantity of hydrogen is controlled through a partial oxidation reaction of gasoline and air in the fuel-reforming device.

5. The method of claim 1 wherein the detected volume of air supplied to the fuel-reforming device is corrected by separately detecting the pressure of air.

6. The method of claim 1 wherein gasoline is employed as the fuel and the air/fuel ratio in the fuel-reforming device is set at 1.5–6.

7. The method of claim 1 wherein the total air/total fuel ratio in the engine is set so that the combustion in the engine can take place in the lean range.

8. Equipment for control of an internal combustion engine with a fuel-reforming device comprising:
   a first path connected to the engine and having a throttle valve;
   a second path branching off the first path at a position upstream of the throttle valve;
   a fuel-reforming device disposed in the second path;
   an air pump to send the air to the fuel-reforming device disposed in the second path;
   a valve mechanically interlocked with the throttle valve disposed in the second path;
   a first air volume sensor disposed in the first path;
   a second air volume sensor disposed in the second path;
   a fuel supply pipe disposed in one of said first and second paths; and
   an electrical controller for calculating the total air volume sucked into the engine from the signals from the first air volume sensor and the second air volume sensor and supplying the volume of fuel matching the calculated total air volume through the fuel supply pipe.

9. Equipment in accordance with claim 8 wherein the fuel supply pipe branches off the second path only at a position upstream of the fuel-reforming device and the volume of fuel matching the total air volume sucked into the engine is supplied through the fuel supply pipe into the air passing through the second path.

10. Equipment in accordance with claim 8 wherein the fuel supply pipe is disposed both at a position upstream of the fuel-reforming device in the second path and in the first path; the controller supplies the volume of fuel matching the air volume passing through the second path, through the fuel supply pipe disposed in the second path; when the fuel supply to match the total air volume sucked into the engine is insufficient, the insufficiency is corrected by increasing the fuel supply through the fuel supply pipe provided in the first path; and, when the fuel supply is excessive, the excess is corrected by decreasing the fuel supply through the fuel supply pipe disposed in the second path.

11. Equipment in accordance with claim 8 wherein the fuel-reforming device controls a reformed gas containing a large quantity of hydrogen through partial oxidation reaction of gasoline and air received.

12. Equipment in accordance with claim 8 wherein the controller adjusts the air/fuel ratio in the fuel-reforming device to 1.5–6.

13. Equipment in accordance with claim 8 wherein the controller adjusts the total air/total fuel ratio in the engine so that the combustion in the engine can take place in the lean range.

14. Equipment in accordance with claim 8 wherein a pressure sensor in addition to the second air volume sensor is disposed in the second path and the signal from the pressure sensor is transmitted to the controller to increase the detecting accuracy of the air volume.

15. Equipment in accordance with claim 8 wherein the throttle valve and the valve in the second path are mechanically interlocked by a link mechanism and the valves are openable to the same angle.

16. Equipment in accordance with claim 8 wherein the fuel supply through the fuel supply pipe is controlled by a magnetic valve disposed in the fuel supply pipe and operated to open or close upon a signal from the controller.

17. Equipment in accordance with claim 8 wherein a mixer is disposed at a point of the second path branching off the first path.

* * * * *